US 6,731,321 B2

(12) United States Patent
Sumi

(10) Patent No.: US 6,731,321 B2
(45) Date of Patent: May 4, 2004

(54) IMAGE RECORDING METHOD AND IMAGE RECORDING APPARATUS

(75) Inventor: Katsuto Sumi, Kanagawa (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 118 days.

(21) Appl. No.: 10/122,184

(22) Filed: Apr. 16, 2002

(65) Prior Publication Data

US 2002/0149667 A1 Oct. 17, 2002

(30) Foreign Application Priority Data

Apr. 16, 2001 (JP) .......................... 2001-116470

(51) Int. Cl.[7] .............. B41J 2/45; B41J 2/455; G01D 15/14
(52) U.S. Cl. ...................................... 347/233
(58) Field of Search .................... 347/233, 225, 347/231, 237, 238, 239, 240, 241, 242, 243, 244, 247, 251, 255, 256, 257, 258, 259, 260, 261; 399/4, 5, 7, 151

(56) References Cited

U.S. PATENT DOCUMENTS 5,049,901 A 9/1991 Gelbart

FOREIGN PATENT DOCUMENTS

EP 0 992 350 A1 4/2000

Primary Examiner—Raquel Yvette Gordon
(74) Attorney, Agent, or Firm—Sughrue Mion, PLLC

(57) ABSTRACT

The method and apparatus record an image on a recording medium attached around the outside surface of a drum rotating at a first constant speed by main-scanning the recoding medium in a main scanning direction with a group of two-dimensionally disposed light sources and exposing the recording medium as well as auxiliary-scanning the recording medium by moving the group of light sources in an auxiliary scanning direction substantially perpendicular to the main scanning direction. The method and apparatus move the group of light sources in the auxiliary scanning direction at a second constant speed and deflect light from the group of light sources for exposing the recording medium in a direction inclined at a predetermined angle θ with respect to the main scanning direction in synchronism with the movement of the recording medium in the main and auxiliary scanning directions with respect to the group of light sources. Thereby the image to be recorded on the recording medium is caused to remain stationary in a relative relation to the recording medium in the main scanning direction and in the auxiliary scanning direction.

8 Claims, 10 Drawing Sheets

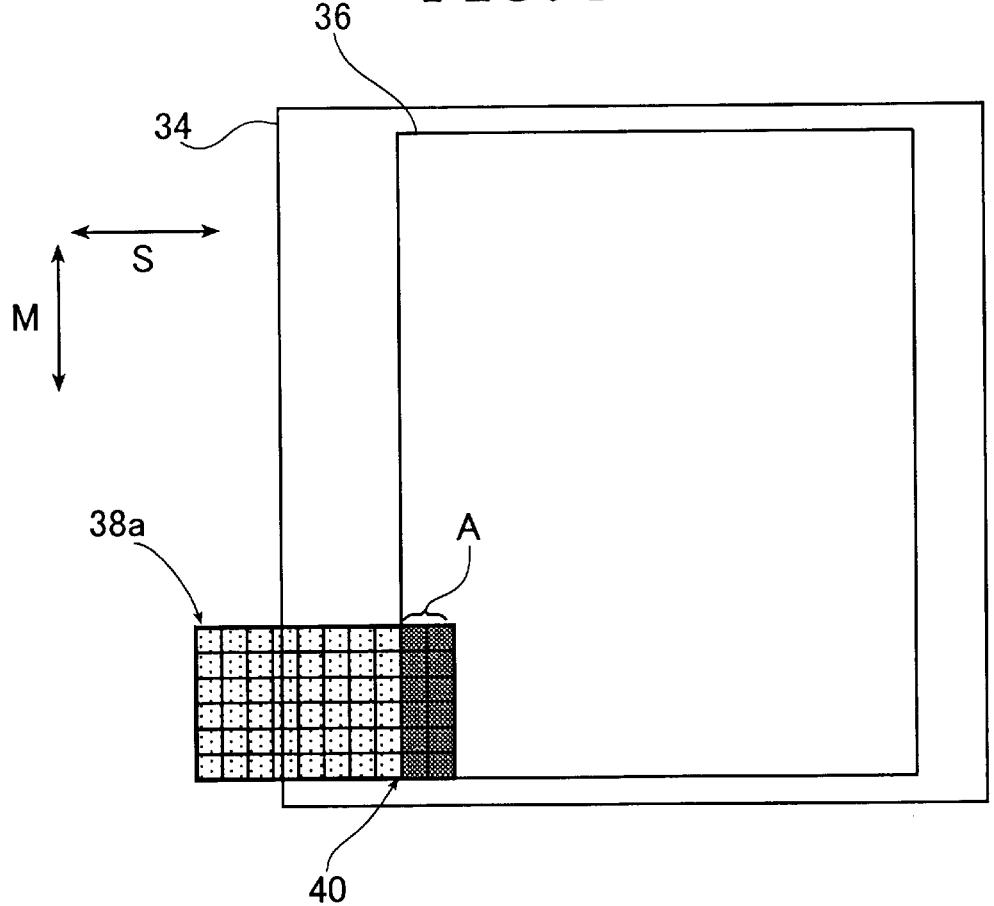

FIRST ROTATION

SECOND ROTATION

IMAGE RECORDING METHOD AND IMAGE RECORDING APPARATUS

BACKGROUND OF THE INVENTION

The present invention relates to the technical field of an image recording method and an image recording apparatus, and more particularly, to an image recording system using a two-dimensionally disposed light modulator, for example, a micro mirror array, a two-dimensional mirror array device such as a Digital Micromirror Device™, and the like.

Mainly used in a digital image exposure system utilized in various types of printers is a so-called laser beam scan exposure (raster scan) for two-dimensionally exposing a recording medium with a laser beam modulated in accordance with an image to be recorded by deflecting the laser beam in a main scanning direction while relatively moving the recording medium and an optical system in an auxiliary scanning direction perpendicular to the main scanning direction.

In contrast, recently, various types of digital image exposure systems have been proposed which use two-dimensional spatial light modulators (2DSLM) such as a liquid crystal display (hereinafter, referred to as "LCD") and the micro mirror array (hereinafter, referred to as "MMA") or the two-dimensional mirror array device (2DMAD) which is commercially available, for example, as a Digital Micromirror Device™ (DMD) manufactured by Texas Instruments Inc. that are utilized as display devices in displays, monitors and so on. In the exposure systems, a recording medium is basically exposed by forming an image displayed by the two-dimensional spatial light modulator on the recording medium.

In particular, the MMA is advantageous in exposure at high speed because the MMA has a modulation speed (response speed) faster than that of the LCD and moreover utilizes light more efficiently than the LCD.

Digital exposure systems using the spatial light modulator are disclosed in, for example, U.S. Pat. No. 5,049,901 and EP 0992350 A1.

The digital exposure systems disclosed in these publications each relate to an image recording apparatus in which an image is formed on a spatial light modulator such as the MMA in the form of an image signal and the image is focused on a recording medium for recording. In the digital exposure systems, the image on the spatial light modulator is moved in synchronism with the movement of the recording medium which is moved in a main scanning direction so that the image can remain stationary on the recording medium. This operation enables image recording of high resolution by obtaining a small recording light spot from an extended light source which has difficulty in narrowing the area.

The principle of an image recording method using the conventional spatial light modulator will be described with reference to FIGS. 12A, 12B and 12C. As shown in FIG. 12A, light impinges on a spatial light modulator 90 and is reflected by a mirror 90a, and the reflected light is imaged onto a recording medium 94 through an optical system such as a lens 92. It is assumed that the recording medium 94 moves at a constant speed as shown by an arrow in FIGS. 12A to 12C. In FIG. 12A, only the mirror 90a is activated and mirrors 90b and 90c are deactivated, and only the light reflected by the mirror 90a is imaged onto the recording medium 94.

Next, when the recording medium 94 slightly moves as shown in FIG. 12B, the mirror 90a in the spatial light modulator 90 is deactivated and only the mirror 90b is activated instead in synchronism with the movement of the recording medium 94, and the same point on the recording medium 94 as shown in FIG. 12A is exposed to the light reflected by the mirror 90b.

Further, when the recording medium 94 moves as shown in FIG. 12C, only the mirror 90c is activated in the spatial light modulator 90 in synchronism with the movement of the recording medium 94 and images at the same position on the recording medium 94.

As described above, in the illustrated example, the spatial light modulator 90 changes image signaling three times so that each of the mirrors 90a, 90b and 90c exposes the recording medium 94 once, in total three times. As a result, the image is moved in synchronism with the movement of the recording medium 94 so as to remain stationary on the recording medium 94 in the main scanning direction (the moving direction of the recording medium).

However, the conventional exposure systems move an image to be recorded on an recording medium in synchronism with (following) the movement of the recording medium and cause the image to remain stationary in the moving direction (main scanning direction) of the recording medium and describes this technical art, but they describe nothing in particular as to the technical art for moving the image in a direction perpendicular to the moving direction of the recording medium (auxiliary scanning direction) and recording the image two-dimensionally.

Accordingly, when a conventionally known ordinary method is used to move the image in the auxiliary scanning direction, after an image of Nimg s lines is recorded in the main scanning direction, the image is moved relatively with respect to the recording medium by Nimg s pixels in the auxiliary scanning direction, and then the next image of Nimg s lines (second line) is recorded. Thereafter, the operation of recording an image (of Nimg g lines) in the main scanning direction and then moving the image in the auxiliary scanning direction is repeated. Here, Nimg s shows the number of pixels of a special light modulator in the auxiliary scanning direction.

However, in the so-called step and repeat system as described above, the image cannot be continuously moved in the auxiliary scanning direction, and further no image is recorded while the image is being moved in the auxiliary scanning direction. Thus, a problem arises in that the moving time of the image is wasted and a scanning efficiency decreases.

For example, in an outer drum scanning system in which an image is exposed on a recording medium wound around the outside surface of a drum, an image of Nimg s lines is recorded a main scanning direction in one rotation of a drum (first rotation), then an optical system for exposing the recording medium is moved in an auxiliary scanning direction that is the axial direction of the drum while the drum is being rotated once (second rotation), and then the image of the next Nimg s lines is recorded in the next one rotation of the drum (third rotation). Therefore, in this case, a scanning efficiency is reduced to one half, and thus it cannot be said that this system has high productivity because it requires a wasteful time. As described above, the step and repeat system has a problem in that productivity is bad.

Further, in the step and repeat system, the image is not continuously moved, and, for example, an optical system is repeatedly moved and stopped mechanically, thereby vibration is generated. As a result, a problem is arisen in that the quality of an image is degraded and the durability and reliability of an image recording apparatus are decreased.

In order to solve the problem described above, the first aspect of the invention provides an image recording method of recording an image on a recording medium attached around outside surface of a drum rotating at a first constant speed by main-scanning the recording medium in a main scanning direction with a group of light sources that are two-dimensionally disposed and exposing the recording medium as well as auxiliary-scanning the recording medium by moving the group of light sources in an auxiliary scanning direction substantially perpendicular to the main scanning direction, comprising the steps of moving the group of light sources in the auxiliary scanning direction at a second constant speed, and deflecting light from the group of light sources for exposing the recording medium in a direction inclined at a predetermined angle θ with respect to the main scanning direction in synchronism with movement of the recording medium in the main scanning direction and the auxiliary scanning direction with respect to the group of light sources, thereby the image to be recorded on the recording medium is caused to remain stationary in a relative relation to the recording medium in the main scanning direction and in the auxiliary scanning direction.

Preferably, after an image of one frame that is a range capable of being exposed by the group of light sources at a time has been exposed to the recording medium by the group of light sources, the image to be recorded on the recording medium is offset in the auxiliary scanning direction by an integral multiple of a first pixel pitch in the auxiliary scanning direction.

Preferably, when the integral multiple of the first pixel pitch in the auxiliary scanning direction is denoted by Ns, number of pixels of one in the main scanning direction is denoted by Nimg m, a second pixel pitch in the main scanning direction is denoted by Pimg m, and the first pixel pitch in the auxiliary scanning direction is denoted by Pimg s, the predetermined angle θ is represented by the following formula: tan θ=(Ns×Pimg s)/(Nimg m×Pimg m).

Preferably, movement of an auxiliary scanning position and a deflecting position of an image of one frame that is a range capable of being exposed by the group of light sources at a time is synchronized with the relative movement of the recording medium with respect to the group of light sources that are two-dimensionally disposed during a non-exposure time zone from completion of exposure of the recording medium for one rotation of the drum to start of exposure of the recording medium for the next one rotation of the drum, and the image of one frame exposed to the recording medium by the group of light sources in the next one rotation of the drum is exposed just adjacent to the image of one exposed to the recording medium first by the group of light sources in one rotation of the drum, and images of frames exposed by the group of light sources are arranged substantially at equal intervals.

In order to solve the problem described above, the second aspect of the invention provides an image recording apparatus comprising a drum rotating at a first constant speed, a recording medium attached around outside surface of the drum, a group of light sources that are two-dimensionally disposed for exposing the recording medium in a main scanning direction, an auxiliary scanning drive system for moving the group of light sources in an auxiliary scanning direction substantially perpendicular to the main scanning direction, and a light deflector for deflecting light from the group of light sources, wherein the auxiliary scanning drive system moves the group of light sources in the auxiliary scanning direction at a second constant speed, and the light deflector deflects the light from the group of light sources for exposing the recording medium in a direction inclined a predetermined angle θ with respect to the main scanning direction in synchronism with movement of the recording medium in the main scanning direction and the auxiliary scanning direction with respect to the group of light sources, thereby the image to be recorded on the recording medium is caused to remain stationary in a relative relation to the recording medium in the main scanning direction and in the auxiliary scanning direction.

It is preferable that the image recording apparatus further comprises a device which offsets an image to be recorded on the recording medium in the auxiliary scanning direction by an integral multiple of a first pixel pitch in the auxiliary scanning direction after the image of one frame thereof that is a range capable of being exposed to the recording medium by the group of light sources at a time has been exposed to the recording medium by the group of light sources.

Preferably, when the integral multiple of the first pixel pitch in the auxiliary scanning direction is denoted by Ns, number of pitches of one frame in the main scanning direction is denoted by Nimg m, a second pixel pitch in the main scanning direction is denoted by Pimg m, and the first pixel pitch in the auxiliary scanning direction is denoted by Pimg s, the predetermined angle θ deflected by the deflector is represented by the following formula: Tan θ=(Ns×Pimg s)/(Nimg m×Pimg m).

It is also preferable that the image recording apparatus further comprises a device which synchronizes movement of an auxiliary scanning position and a deflecting position of an image of one frame that is a range capable of being exposed by the group of light sources at a time with the relative movement of the recording medium with respect to the group of light sources that are two-dimensionally disposed during a non-exposure time zone from completion of exposure of the recording medium for one rotation of the drum to start of exposure of the recording medium for the next one rotation of the drum, wherein the image of one exposed to the recording medium by the group of light sources in the next one rotation of the drum is exposed just adjacent to the image of one exposed first by the group of light sources in one rotation of the drum, and images of frames exposed by the group of light sources are arranged substantially at equal intervals.

SUMMARY OF THE INVENTION

Accordingly, it is an object of the present invention made in view of the above problems to provide an image recording method and an image recording apparatus permitting auxiliary scanning to be carried out continuously, that is, capable of increasing productivity in image recording by making a scanning efficiency to substantially 1.0.

BRIEF DESCRIPTION OF THE DRAWINGS

FIG. 4 is a view explaining a first image recorded on the plate in the embodiment;

FIG. 11 is a view explaining another example of the embodiment in which an image is recorded while inclining an MMA or the like.

DETAILED DESCRIPTION OF THE INVENTION

An image recording method and an image recording apparatus of the present invention will be described below in detail with reference to preferable embodiments shown in the accompanying drawings.

Figure 1:
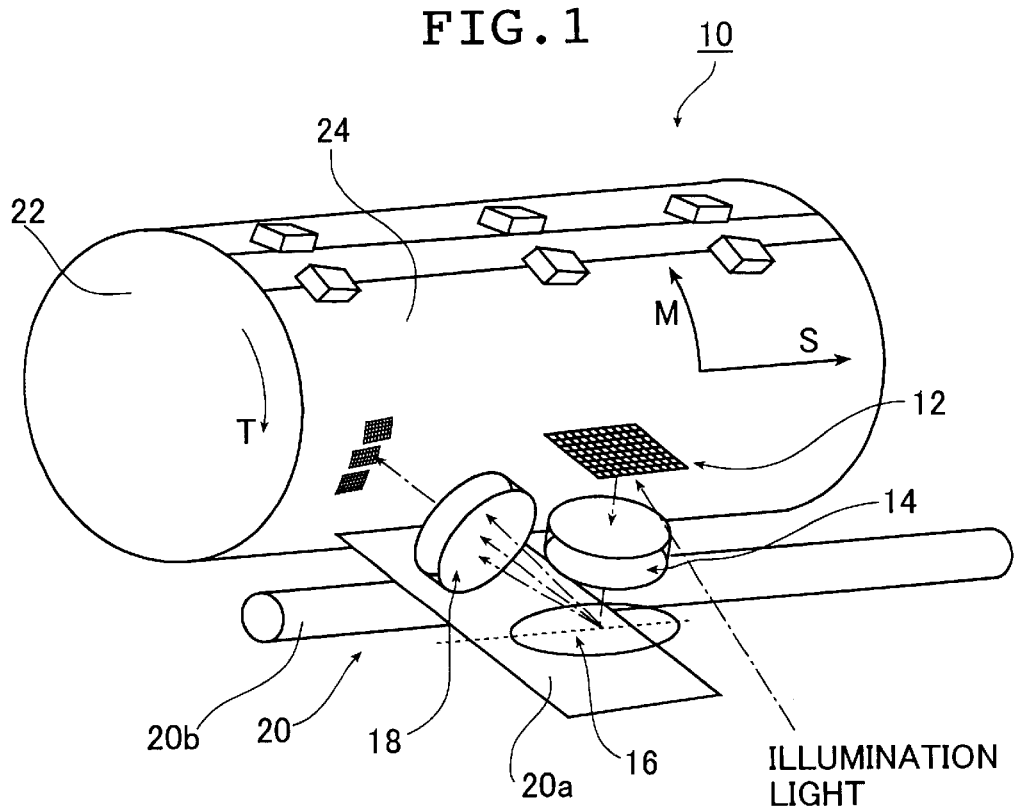
FIG. 1 is a perspective view showing the schematic arrangement of an embodiment of an image recording apparatus according to the present invention.

FIG. 1 is a perspective view showing the schematic arrangement of an embodiment of the image recording apparatus according to the present invention.

The illustrated image recording apparatus 10 is an apparatus for recording an image by two-dimensionally scan-exposing a recording medium using an array of reflecting light source elements produced in a two-dimensional spatial light modulator (2DSLM) such as a micro mirror array (hereinafter, referred to as "MMA") or a two-dimensional mirror array device (2DMAD) as so-called Digital Micromirror Device™ (DMD) by illumination with an illumination light flux and a so-called external drum (external surface drum).

In FIG. 1, the image recording apparatus 10 includes a light source (not shown), an MMA 12 for receiving illumination light emitted from the light source, a collimator lens 14, a light deflector (deflector) 16, a focusing lens 18, an auxiliary scanning drive system 20, and an external drum (outer drum) 22 (hereinafter, simply referred to as "drum" 22). Further, the drum 22 has a recording medium 24 wound around the external surface thereof and attached therearound.

While not shown, various types of light sources, for example, so-called large or broad area light sources can be used in accordance with the spectral sensitivity of the recording medium used as long as they can emit a sufficient quantity of light. For example, an ultra-high pressure mercury lamp, a metal halide lamp, and the like may be used as the light source when a PS plate (conventional PS plate) which can be exposed by ultraviolet light, is used as the recording medium.

Further, an infrared broad area laser diode, and the like may be used to a heat mode plate which is sensitive to infrared light. In addition to the above, a halogen lamp, a xenon lamp, a two-dimensional array-state light source (LED), and the like may also be used in accordance with the recording medium used.

The MMA 12 is a two-dimensional spatial light modulator in which rectangular micromirrors capable of rotating (swinging) a predetermined angle about a predetermined rotation axis are two-dimensionally disposed. The electrostatic rotation of the micromirrors activates and deactivates exposure by modulating light for each micromirror (= corresponding to each pixel). The MMA 12 is formed on a silicon chip by a micromachine technology making use of a process for manufacturing a semiconductor device.

The MMA 12 used in the image recording apparatus 10 of the illustrated case has 1024×1280 pixels with intervals therebetween set to 17 μm. Further, respective components are disposed such that the rotational direction (shown by an arrow T in FIG. 1) of the drum 22 to be described later, can optically agree with the direction of the pixel train of the 1024 pixels of the MMA 12 (hereinafter, the direction shown by an arrow M in FIG. 1 is referred to as a "main scanning direction") and that the axial direction of the drum 22 can optically agree with the direction of the pixel train of the 1280 pixels of the MMA 12 (hereinafter, the direction shown by an arrow S in FIG. 1 is referred to as an "auxiliary scanning direction").

Note that the spatial light modulator as the group of two-dimensionally disposed light sources used in the present invention is not limited to the MMA 12 of the illustrated case, and various types of modulators such as liquid crystal type, PLZT type, EO (electrooptical) type and AO (acoustooptic) type can be used. However, the MMA is most preferable among them from the view point of a modulation speed, an efficiency for light utilization, and the like.

The collimator lens 14 is used to allow the light reflected by the MMA 12 to be incident on the light deflector 16 as collimated light.

The light deflector 16, the operation of which will be described later in detail, deflects the light incident thereon through the collimator lens 14 in a direction having a predetermined angle θ with respect to the main scanning direction in synchronism with the rotation of the drum 22 and with the movement of an optical system in the auxiliary scanning direction. That is, the light deflector 16 is driven by a drive unit (light deflector driver) the illustration of which is omitted in FIG. 1 and changes the direction of light in synchronism with the relative movement of the recording medium 24 caused by the rotation of the drum 22 and the movement of the optical system so that the image data of one frame, which is the range capable of being exposed by the group of two-dimensionally disposed light sources (MMA 12) at a time, is imaged at the same position on the recording medium 24 even if the recording medium 24 is relatively moved. Preferred examples of the light deflector 16 include a galvano-scanner (galvano-meter mirror), a polygonal mirror, a piezo system, and devices for shifting lenses.

Further, the focusing lens 18 images the light deflected by the light deflector 16 at a predetermined position on the recording medium 24 wound around the drum 22.

The light reflected by the MMA 12 is finally imaged on the surface of the recording medium 24 held on the surface of the drum 22. Examples of the recording medium 24 include a light mode sensitive material and a heat mode sensitive material. Further, the recording medium is not particularly limited and may be a film or a plate.

The (external) drum 22 is a cylinder which holds the recording medium 24 on the outside surface thereof and rotates in the direction shown by the arrow T in FIG. 1 about an axis.

Figure 2:
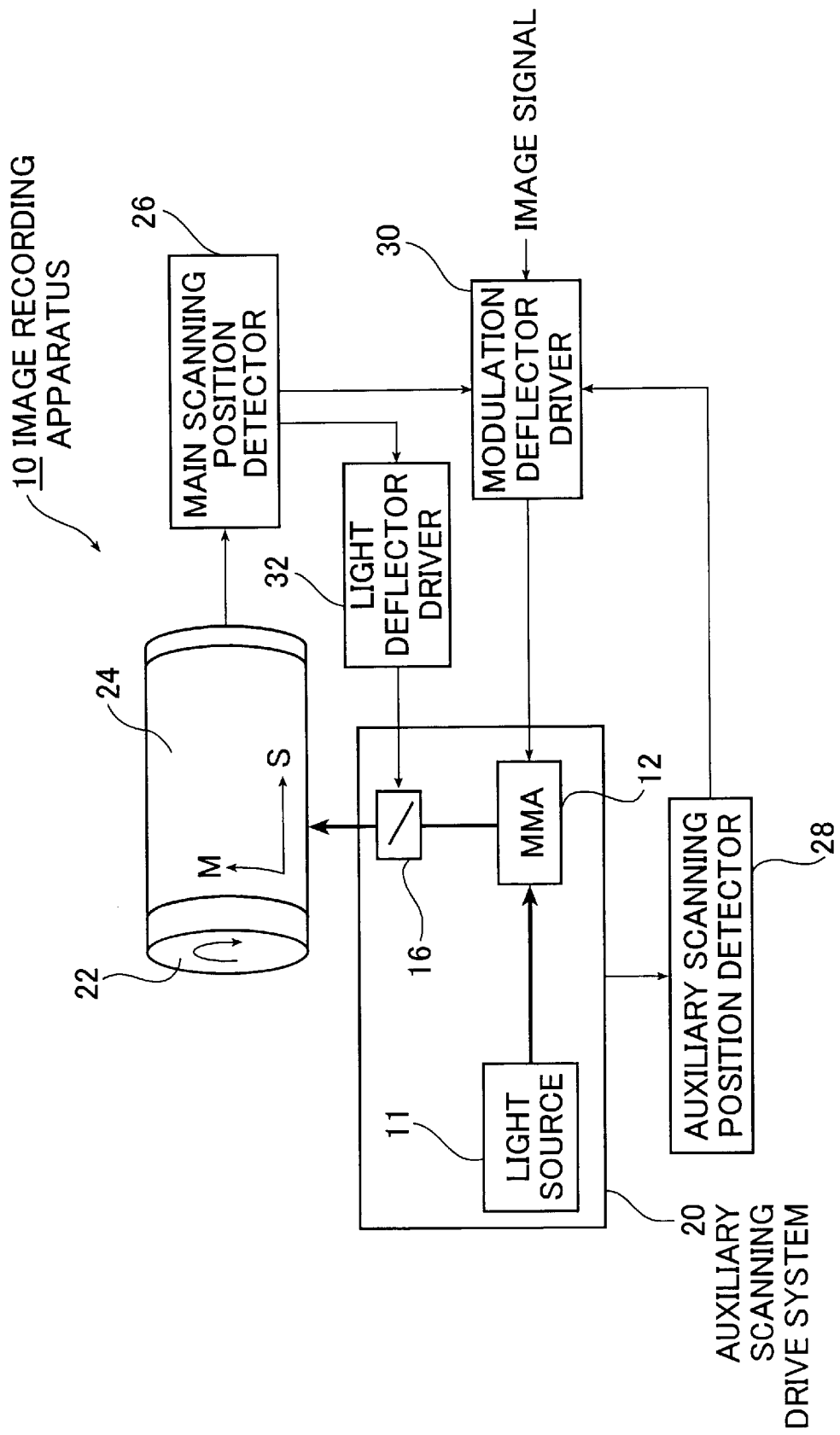
FIG. 2 is a block diagram showing the control system of recording timing of the image recording apparatus according to the embodiment under consideration.

The optical system including the light source denoted by reference numeral 11 in FIG. 2, the MMA 12, the collimator lens 14, the light deflector 16, and the focusing lens 18 is integrated together as a unit and moved by an auxiliary scanning drive system 20 at a predetermined speed in the auxiliary scanning direction (the direction shown by the arrow S in FIG. 1). The auxiliary scanning drive system 20 is composed of a moving table 20a on which the optical system is mounted and a moving shaft 20b on which the moving table 20a moves.

Further, FIG. 2 shows a block diagram of the control system of recording timing of the image recording apparatus 10 according to the embodiment under consideration. FIG. 2 shows a control system for controlling the respective components, in addition to the arrangement shown in FIG. 1.

As shown in FIG. 2, the optical system including the light source 11, the MMA 12 and the light deflector 16 (the collimator lens 14 and the focusing lens 18 are omitted in FIG. 2) is arranged integrally and moved continuously by the auxiliary scanning drive system (auxiliary scanning unit) 20 at a predetermined speed in the auxiliary scanning direction S at least when an image is recorded.

As described above, the light deflector 16 deflects the light reflected (modulated) by the MMA 12 in the direction having the predetermined angle θ with respect to the main scanning direction M in synchronism with the relative movements of the recording medium 24 in the main scanning direction and the auxiliary scanning direction that are caused by the rotation of the drum 22 and the movement of the optical system in the auxiliary scanning direction. A main scanning position detector 26 is disposed to the drum 22 to control the timing of the deflection as well as an auxiliary scanning position detector 28 is disposed to the auxiliary scanning drive system 20 to detect an auxiliary scanning position. For example, a rotary encoder, which detects a rotational position of the drum 22, can be used as the main scanning position detector 26.

Further, a modulation signal generator 30 is disposed to the MMA 12 to send the image data for one frame to the MMA 12 while changing the control pattern in the MMA 12.

An image signal is supplied to the modulation signal generator 30, modulated based on the detection signals from the main scanning position detector 26 and the auxiliary scanning position detector 28 and then sent to the MMA 12.

Further, a light deflector driver 32 for driving the light deflector 16 is disposed to the light deflector 16. The light deflector driver 32 drives the light deflector 16 based on the detection signals from the main scanning position detector 26 and the auxiliary scanning position detector 28 so that the light reflected by the MMA 12 can be deflected in the direction having the predetermined angle θ with respect to the main scanning direction in synchronism with relative movement of the recording medium 24.

Operation of the image recording apparatus 10 of the embodiment will be described with reference to FIGS. 3 to 11.

Figure 3:
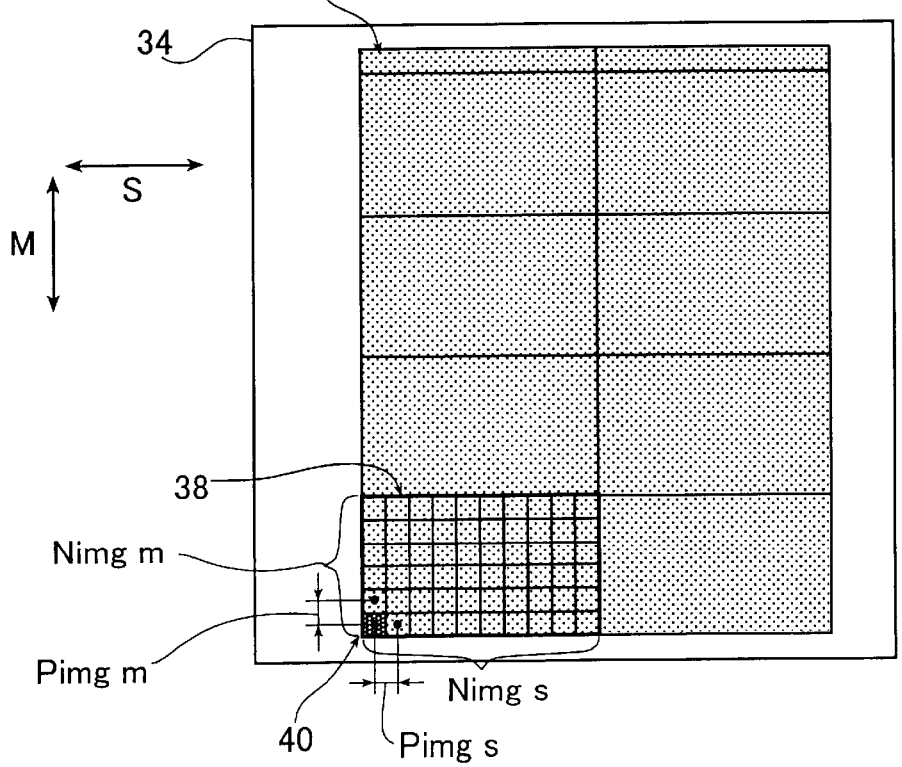
FIG. 3 is a view explaining a plate where an image is recorded in the embodiment.

FIG. 3 shows a plate 34 acting as the recording medium 24 wound around the drum 22 by developing it in a flat state. A longitudinal direction shown by an arrow M in FIG. 3 is the main scanning direction, and a lateral direction shown by an arrow S is the auxiliary scanning direction. An image is not recorded on the entire surface of the plate 34 but is recorded within an image recording range 36. In the embodiment, when one image (overall image recorded in the image recording range of one plate) is recorded, the overall image is divided into small segments each can be exposed by the MMA 12 at a time, and each of the small segments is referred to as a frame 38. Accordingly, the size of one frame is determined by the number of pixels that can be carried by the MMA 12 and a pixel pitch. The number of pixels of one frame in the main scanning direction is denoted by Nimg m, and the number of pixels thereof in the auxiliary scanning direction is denoted by Nimg s. As described above, in the MMA 12 of the embodiment, Nimg m=1024, and Nimg s=1280, for example. In this case, the size of one frame is 1024×1280. Further, a pixel 40 that is a minimum unit constituting the frame 38 is formed in an approximately rectangular shape. The interval between the pixels in the main scanning direction is referred to as a main scanning pixel pitch and shown by Pimg m, whereas the interval between the pixels in the auxiliary scanning direction is referred to as an auxiliary scanning pixel pitch and shown by Pimg s.

In the embodiment, the image is sent continuously in the auxiliary scanning direction without feeding it by the step and repeat system to thereby improve the productivity when the image is recorded. To continuously feed the image in the auxiliary scanning direction, the image is recorded by a "spiral exposure system", which will be described below.

When the image is recorded, first, the image signal of a first one frame 38a in the image is supplied to the MMA 12 by the modulation signal generator 30, and the respective micro mirrors of the MMA 12 are activated and deactivated according to this data. When illumination light impinges on the one frame 38a from the light source 11, recording light that carries the image data of the one frame represented by the image signal can be obtained. This light is imaged on the plate 34 acting as the recording medium 24 held on the surface of the drum 22 in rotation through the optical system composed of the collimator lens 14, the light deflector 16, the focusing lens 18, and the like. At this time, it is only within the image recording range 36 in the plate 34 that the image is actually recorded. Thus, the image data is naturally controlled such that the image at the left end of the frame 38 of FIG. 3 is recorded in the portion shown by a symbol A of FIG. 4. Note that the position of the first frame 38a in the auxiliary scanning direction from which recording starts (the size of the portion shown by the symbol A in FIG. 4) is determined from the image recording range 36 and the size of the frame 38 in the main scanning direction and the auxiliary scanning direction.

Further, while the image is being exposed, the drum 22 is rotated in a rotational direction T at a predetermined speed Vm and the optical system is continuously moved in the auxiliary scanning direction S at a constant speed Vs.

Figure 5A:
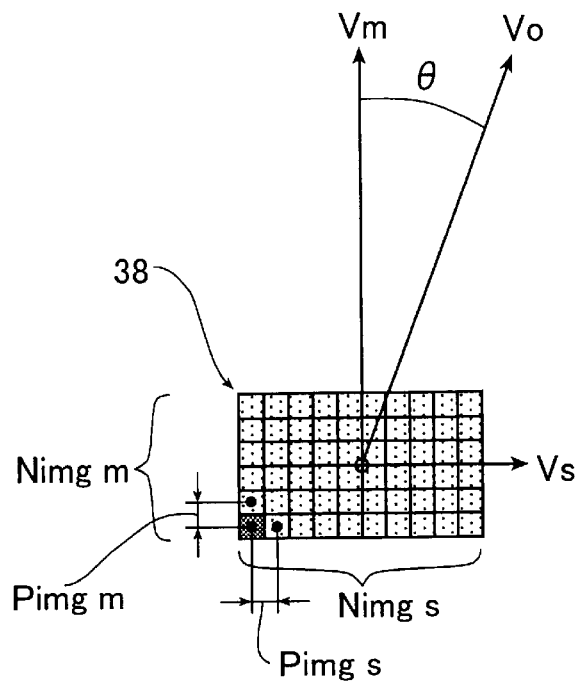
FIG. 5A is a view explaining the relative movement of a recording image.

Accordingly, if the optical system simply illuminates only the plate 34 and does not control the direction of light, the image of a frame 38 to be recorded on the plate 34 moves at the speed Vm in the main scanning direction and at the speed Vs in the auxiliary scanning direction with a result that it flows in the direction of the composite speed V0 of these speeds Vm and Vs, as shown in FIG. 5A.

Figure 5B:
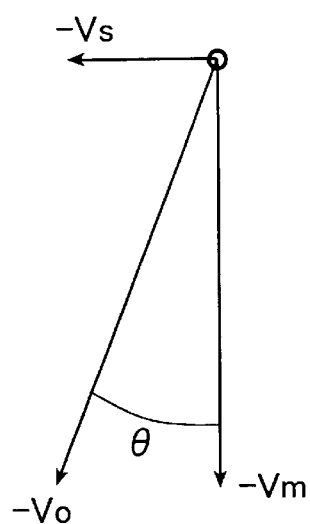
FIG. 5B is a view explaining a deflecting direction.

Thus, to cause the recording image to remain stationary on the plate 34, the light is deflected by the light deflector 16 with a speed −V0 that has the same magnitude as that of the composite speed V0 and a direction opposite to that of it, as shown in FIG. 5B.

This direction can be expressed by the following formula (1) when the angle between the main scanning direction and the direction of the composite speed V0 is shown by θ.

$$\tan \theta = |Vs|/|Vm| \quad (1)$$

Figure 6:
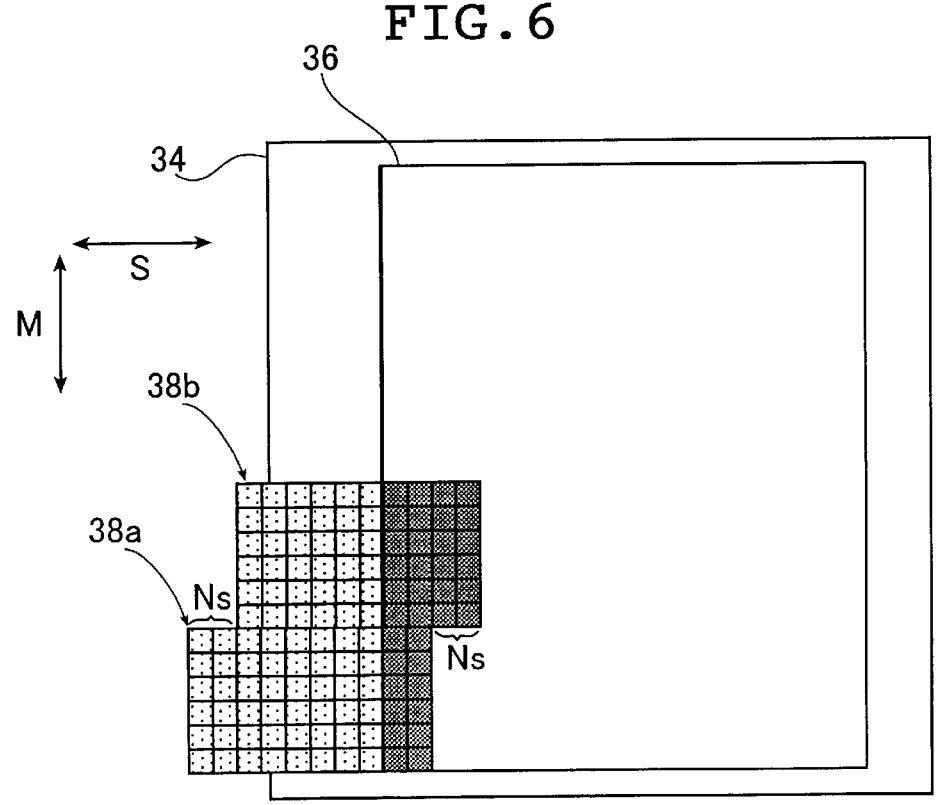
FIG. 6 is a view explaining an image of a second frame recorded on the plate in the embodiment.

The light is deflected by the light deflector 16 in the direction having the angle θ with respect to the main scanning direction while the drum 22 is being rotated in an amount corresponding to one frame so as to cause the recording image to remain stationary on the plate 34. When the drum 22 has been rotated in the amount corresponding to the one frame or less in the main scanning direction, the MMA 12 is deactivated and the light deflector 16 is returned to its original position. Then, the image signal of the next frame (second frame) is supplied to the MMA 12, and the image of a second frame 38b is recorded as shown in FIG. 6, similarly to the first frame 38a.

The pixel pitch of one pixel, which is the minimum unit constituting one frame, in the main scanning direction is shown by Pimg m, the pixel pitch thereof in the auxiliary scanning direction is shown by Pimg s, the number of pixels of one frame in the main scanning direction is shown by Nimg m, and the number of pixels thereof in the auxiliary scanning direction is shown by Nimg s, as shown in FIG. 3 or FIG. 5A, the period of time during which the drum 22 is rotated in the amount corresponding to one frame is expressed by Nimg m×Pimg m/Vm, and the image (intrinsically) advances (Nimg m×Pimg m/Vm)×Vs during the period of time.

In the image recording method of the embodiment, as one condition for causing all the pixels to be arranged within the image recording range 36 at the same pitch in phase, the image must advance an integral multiple of the pixel pitch in the auxiliary scanning direction when the drum 22 is rotated in the amount corresponding to one frame. When it is assumed now that Ns shows a positive integer, the multiplication of the pixel pitch in the auxiliary scanning direction by Ns results in (Nimg m×Pimg m/Vm)×Vs=Ns× Pimg s. Accordingly, the following formula (2) can be obtained.

$$Nimg\ m \times Pimg\ m/Vm = Ns \times Pimg\ s \qquad (2)$$

As to the second frame 38b, while the drum 22 is being rotated in the amount corresponding to one frame, the light is defected by the light deflector 16 in a direction opposite to the composite speed V0 having the angle θ with respect to the main scanning direction, and the recording image of the second frame 38b is caused to remain stationary on the plate 34 and recorded thereon, as shown in FIG. 5B, similarly to the first frame 38a.

Figure 7:
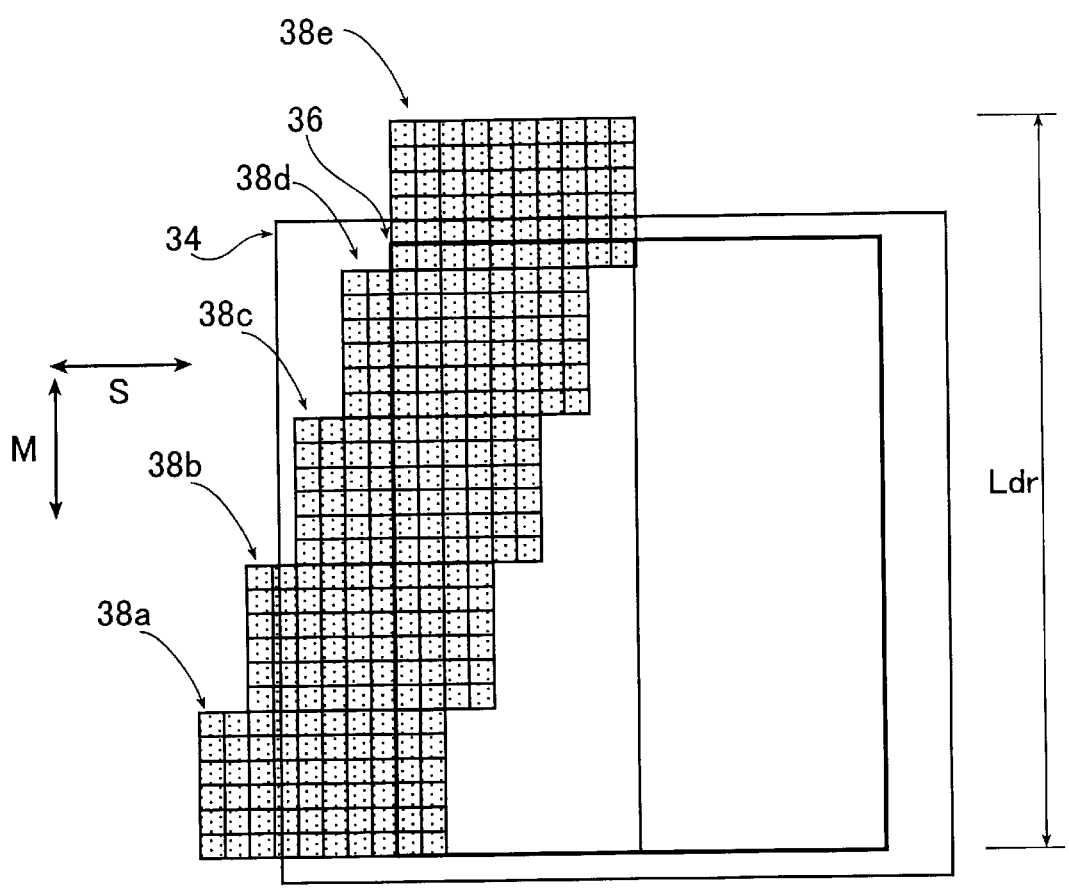
FIG. 7 is a view explaining an image recorded in the first rotation of a drum.

Subsequently, the images of a third frame 38c, a fourth frame 38d, . . . , are recorded in the same manner, as shown in FIG. 7. Then, in the embodiment, when the image of the next fifth frame 38e is recorded, the image has been recorded in the one rotation (first rotation) of the drum in the main scanning direction in the image recording range 36. At this time, the length from first frame 38a to the final frame 38e just corresponds to the peripheral length Ldr of the drum 22.

In this case, when the light deflector 16 has been returned to its original position, the position just agrees with the initial position of the next one rotation (second rotation) of the drum (the lowest position of the image recording range 36) in the main scanning direction M.

Figure 8:
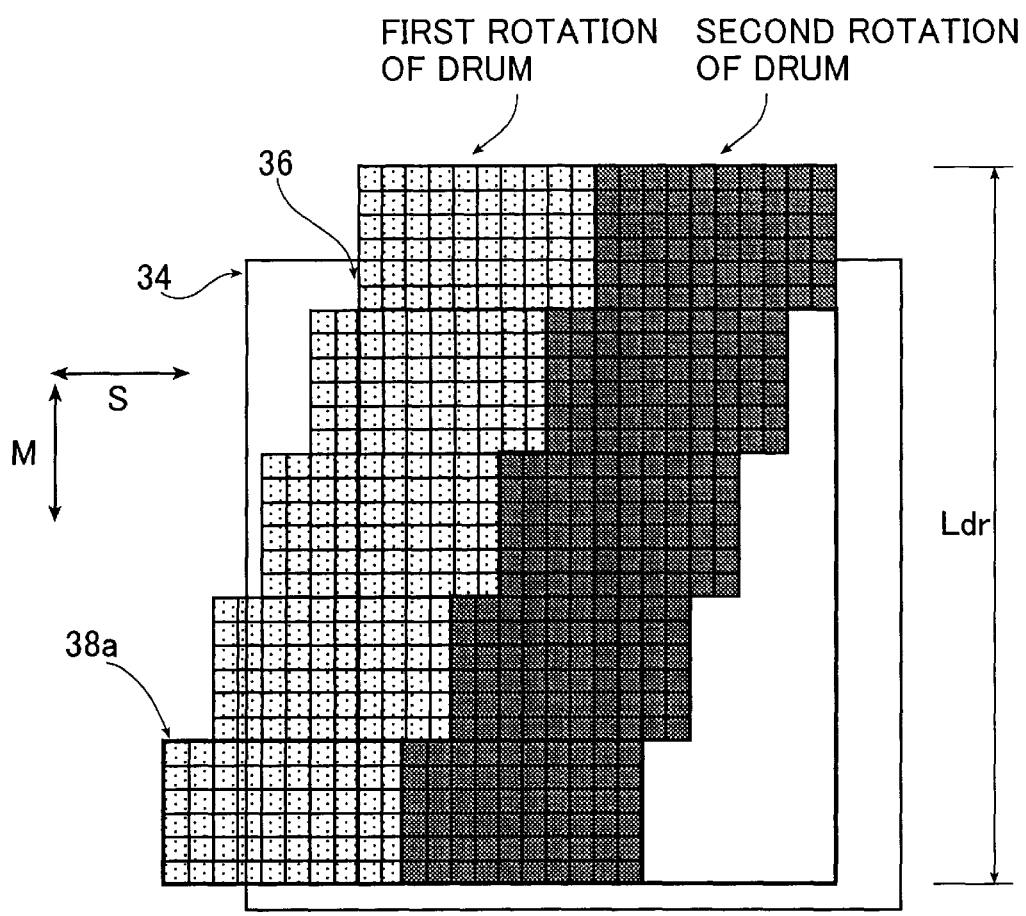
FIG. 8 is a view explaining an image recorded in the second rotation of the drum.

Further, in the image recording method of the embodiment, another condition for causing all the pixels to be arranged in phase within the image recording range 36 at equal pitch resides in that a frame moves just one frame in the auxiliary scanning direction at the time scanning has been completed in the peripheral length of the drum in the main scanning direction M. That is, as shown in FIG. 8, a frame 39a whose image is recorded first in the second rotation of the drum must be located just adjacent to the first frame 38a whose image has been recorded first in the first rotation of the drum without forming any interval therebetween.

For this purpose, the following formula (3) must be established when the drum peripheral length is shown by Ldr and the length of one frame in the auxiliary scanning direction is shown by Limg s.

$$Ldr/Vm = Limg\ s/Vs \qquad (3)$$

The formula (3) can be changed to the following formula (4).

$$Vs/Vm = Limg\ s/Ldr \qquad (4)$$

The following formula (5) is established from the aforementioned formula (2)

$$Vs/Vm = (Ns \times Pimg\ s)/(Nimg\ m \times Pimg\ m) \qquad (5)$$

Further, the following formula (6) can be obtained from the formulas (4) and (5).

$$Limg\ s/Ldr = (Ns \times Pimg\ s)/(Nimg\ m \times Pimg\ m) \qquad (6)$$

Here, Limg s=Nimg s×Pimg s. When Ldr=Ndr×Pimg m in which Ndr shows a positive integer, the following formula (7) can be obtained from the formula (6).

$$(Nimg\ s \times Pimg\ s)/(Ndr \times Pimg\ m) = (Ns \times Pimg\ s)/(Nimg\ m \times Pimg\ m) \qquad (7)$$

Further, the following formula (8) can be obtained from the formula (7).

$$Nimg\ s/Ndr = Ns/Nimg\ m \qquad (8)$$

Incidentally, the following formula (9) is established from the formulas (1) and (5).

$$\tan\theta = (Ns \times Pimg\ s)/(Nimg\ m \times Pimg\ m) \qquad (9)$$

That is, the angle θ with respect to the main scanning direction that is the angle showing the direction in which light is deflected by the light deflector 16 is given by the formula (9).

In particular, when the pitch in the main scanning direction is equal to the pitch in the auxiliary scanning direction as shown by Pimg m=Pimg s, the formula (9) is shown by the following formula (10)

$$\tan\theta = Ns/Nimg\ m \qquad (10)$$

For example, the assumption of Nimg m=1024 and Nimg=1280 results in Ns=10 and Ndr=131072, which satisfies the above condition.

At this time, the following formula can be obtained from the formula (10).

$$\tan\theta = Ns/Nimg\ m = 10/1024 = 0.00976$$

θ=0.5595° can be obtained from the above formula.

Figure 9:
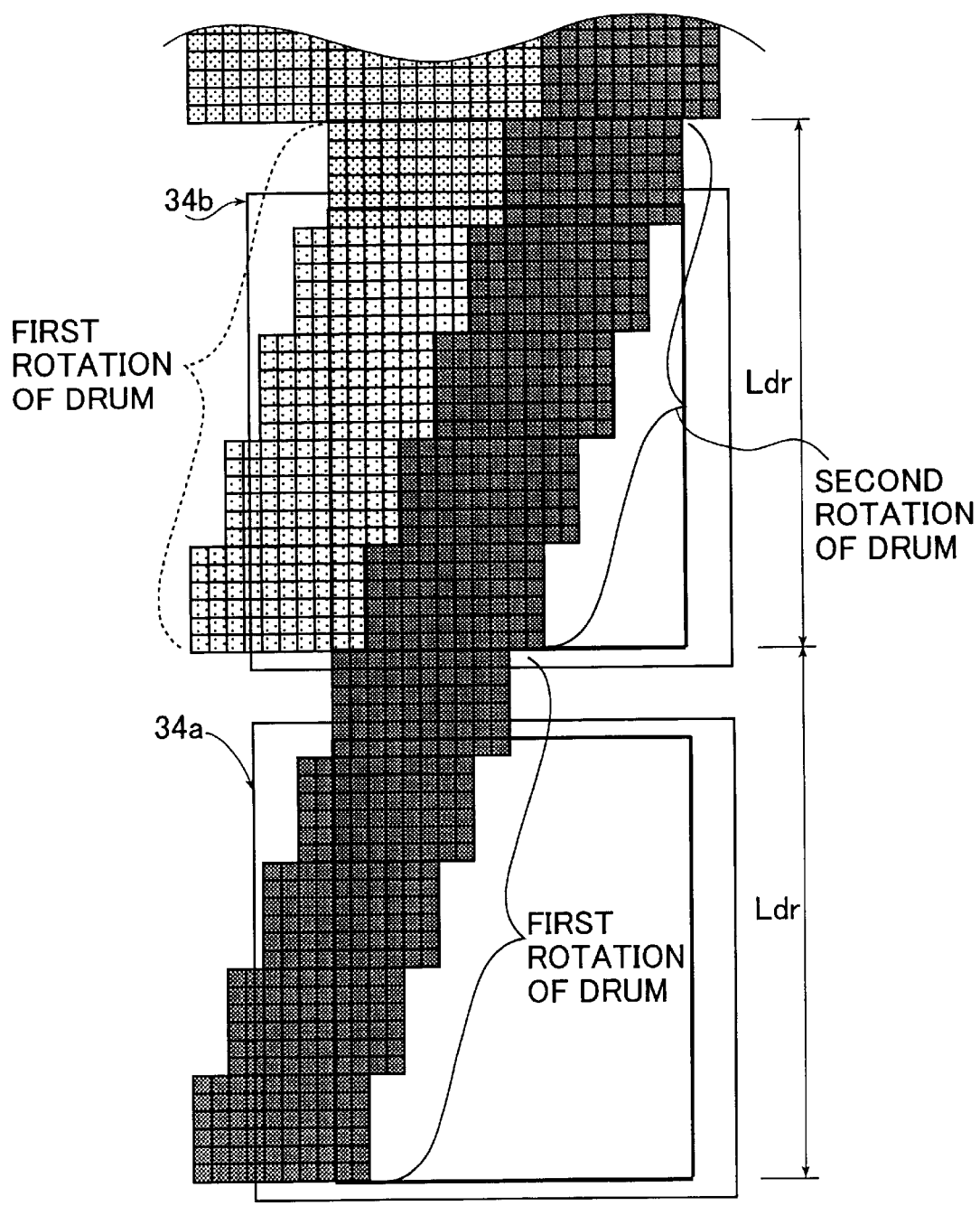
FIG. 9 is a view explaining the drum by continuously developing it on a flat surface when it rotates at first and second times.

As described above, the image is recorded while being offset in both the main scanning direction and the auxiliary scanning direction also in the second rotation of the drum 22 as shown in FIG. 8, similarly to the first rotation thereof. FIG. 9 shows the recording state of the image that is recorded on a plate 34a in the first rotation of the drum and on a plate 34b, which is shown separately from plate 34b, in the second rotation thereof.

As described above, in the image recording method of the embodiment, auxiliary scanning can be carried out continuously by offsetting the image also in the auxiliary scanning direction so as to arrange the respective frames constituting the image stepwise and by exposing the image spirally.

In the example described above, a frame just following the final frame 38e whose image has been recorded in the image recording performed in the first rotation of the drum is the first frame 39a in the image recording performed in the second rotation thereof. In such circumstances, no problem arises if, for example, an auxiliary scanning speed is controlled to keep a constant speed. In general, however, it is not always controlled constant due to a drum diameter, a plate size such as a plate thickness, and the like.

Figure 10:
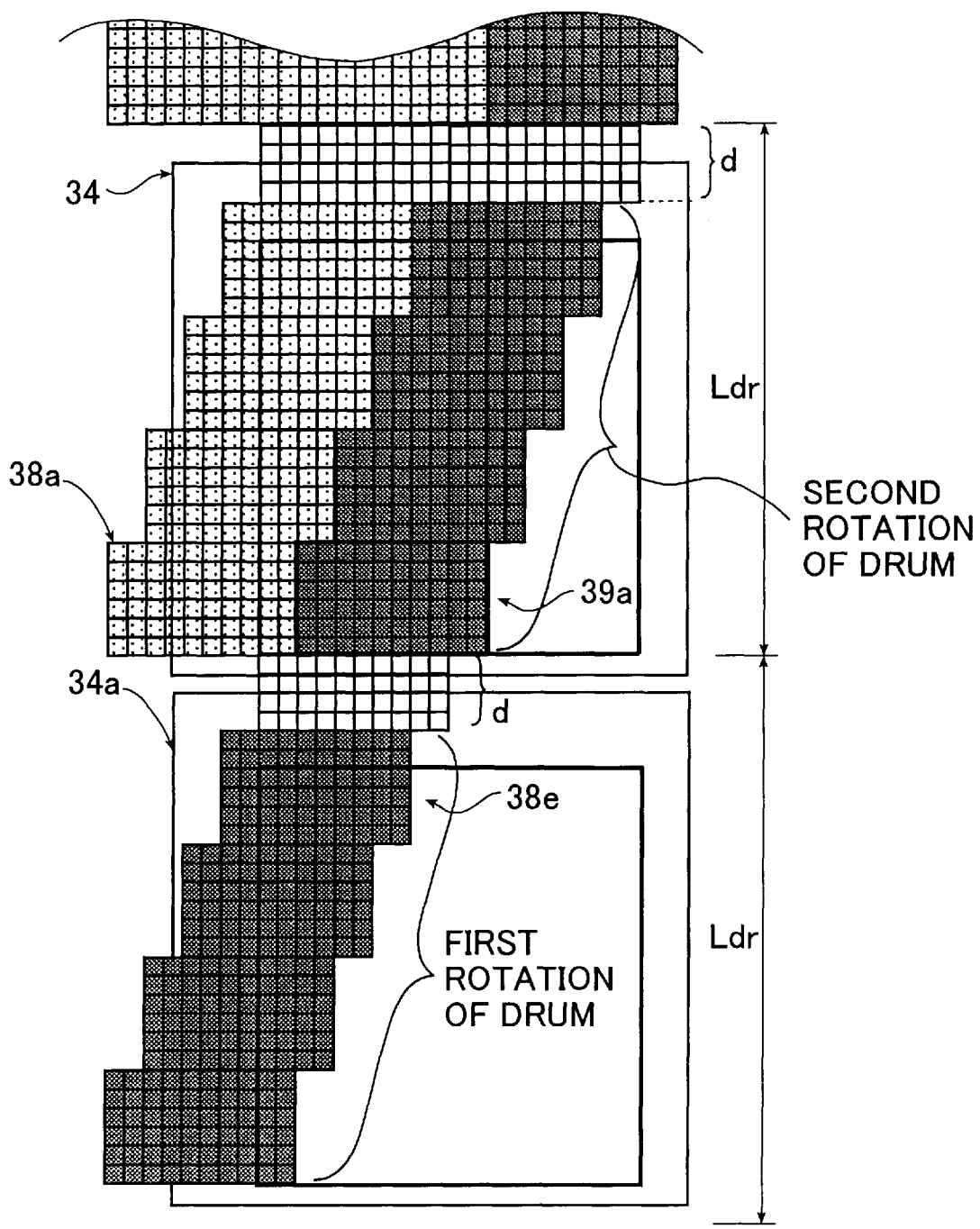
FIG. 10 is a view explaining an example in which a non-exposing time zone exists between the first and second rotations of the drum.

For example, as shown in FIG. 10, when the length of the drum when it rotates once is not equal to an integral multiple of the size of one frame different from that shown in FIG. 9, the frame 38a is correctly positioned adjacent to the frame 39a in FIG. 10 by controlling the auxiliary scanning speed and the deflection performed by the deflector in the non-exposure time zone d (shown as the length on the rotating drum in FIG. 10).

That is, when the main scanning position detector 26 detects that the drum 22 rotates d after the image of the final frame 38e has been recorded in the first rotation, the first frame 39a in the second rotation is controlled so as to be positioned just adjacent to the first frame 38a in the first rotation by at least one of the light deflector 16, the auxiliary scanning drive system 20, and the modulation signal generator 30 while synchronizing the movement of the deflecting positions thereof by the light deflector driver 32 and the movement of the auxiliary scanning position thereof by the auxiliary scanning drive system 20 with the rotation of the drum 22.

Then, the image signal of the first frame 39a in the second rotation is supplied to the MMA 12, and thereafter the recording image is caused to remain stationary by deflecting the light in the direction having the angle θ with respect to the main scanning direction, similarly to the first rotation, thereby the image is recorded. When the image has been recorded in the second rotation and is recorded in a third rotation, the same control as that described above is carried out in the non-exposing time zone d so as to synchronize the movement of an auxiliary scanning position and a deflecting position with the relative movement of the plate.

In this case, the image is generally recorded while the drum rotates in the amount shown by (auxiliary scan recording size)/(frame size in auxiliary scanning direction)+1.

Figure 11:
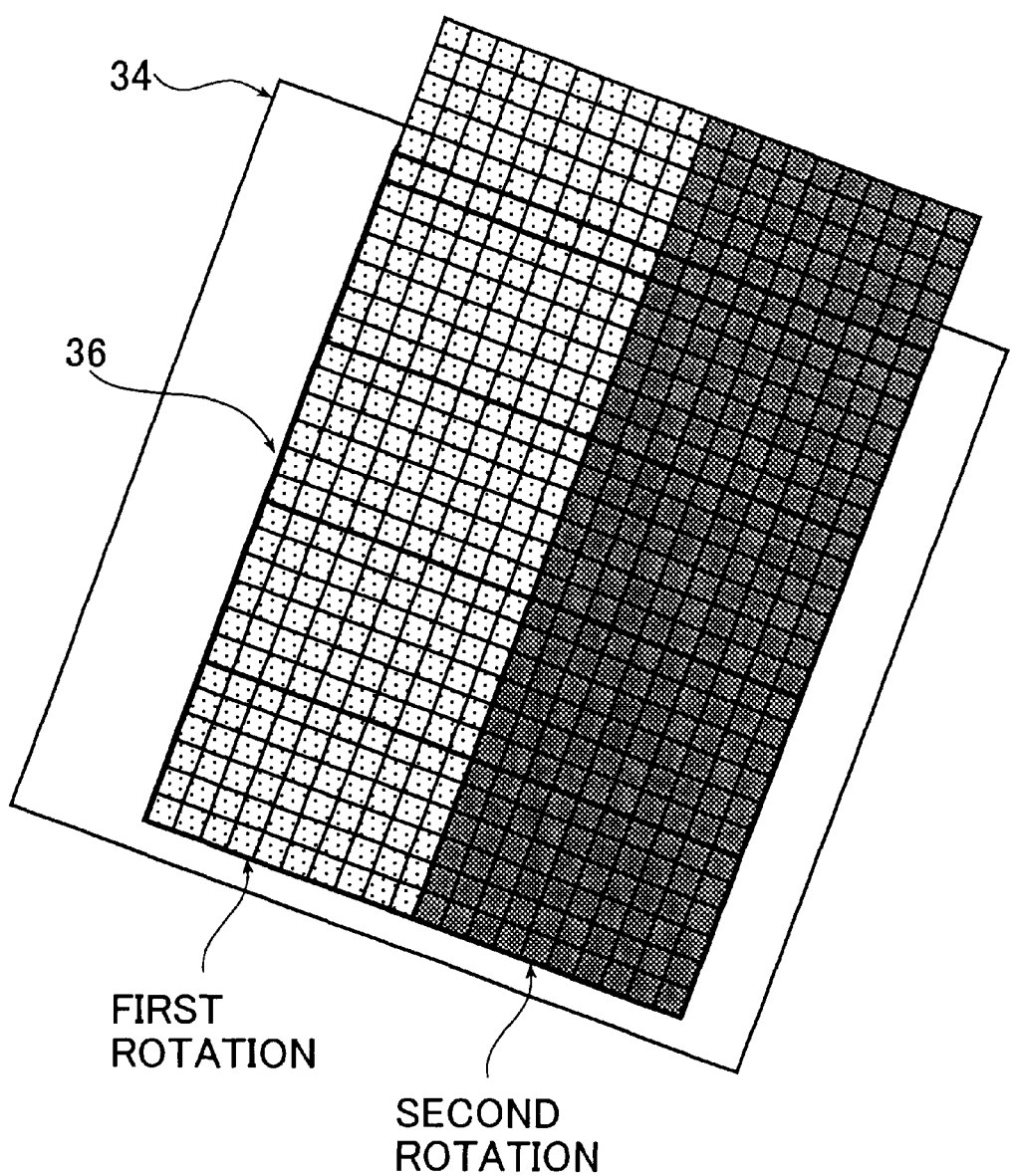
Figure 12A:
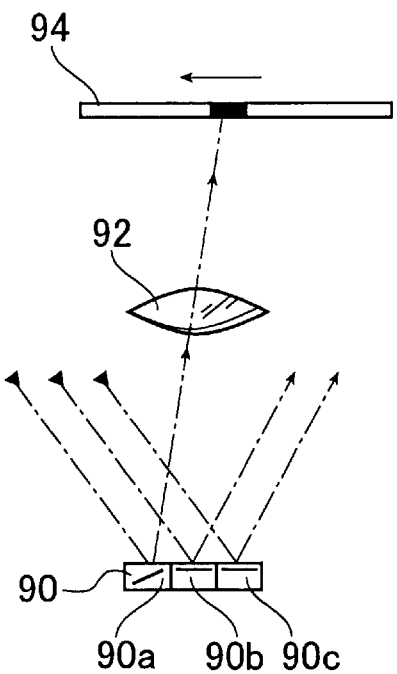
FIGS. 12A, 12B and 12C are views explaining the principle of an image recording method using a conventional spatial light modulator.
Figure 12B:
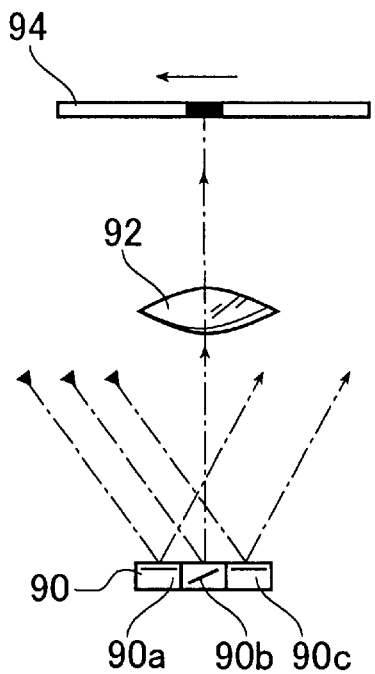
Figure 12C:
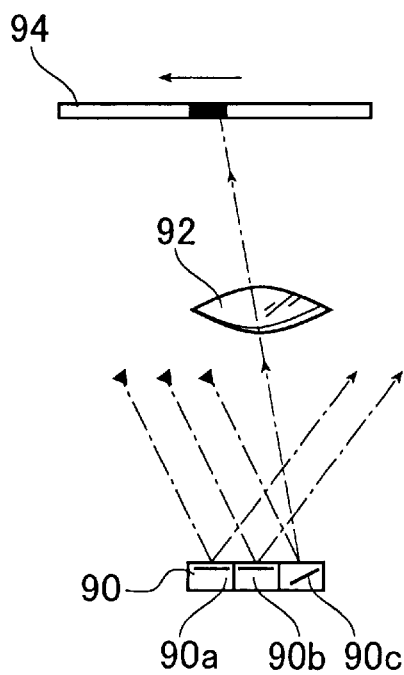

Further, as another example, the recording image may be controlled to remain stationary in such a manner that the plate 34 is attached to the drum in an inclined state, the MMA 12 is inclined, and the direction in which light is deflected by the light deflector 16 is synchronized with the relative movement of the plate 34, as shown in FIG. 11. With this operation, the respective frames can be arranged straight without being arranged stepwise, different from the aforementioned example.

As described above in detail, according to the embodiment, in the external drum scanning system using the MMA as the group of light sources in the two-dimensional arrangement, the image is sent continuously in the auxiliary scanning direction and the so-called spiral scanning is carried out. As a result, productivity in image recording can be improved and further it is possible to remove the vibration of machine.

While the image recording apparatus and the image recording method of the present invention have been described above in detail, the present invention is by no means limited to the above examples and it is needless to say that various improvements and modifications can be made within the range which does not depart from the gist of the present invention.

As described above, according to the present invention, it is possible to record an image with high resolution using the expanded light source. Further, the vibration of machine can be removed by performing auxiliary scanning continuously as well as the scanning efficiency in image recording can be made substantially 100%, thereby productivity is doubled as compared with that of an step and repeat system.

What is claimed is:

1. An image recording method of recording an image on a recording medium attached around outside surface of a drum rotating at a first constant speed by main-scanning said recording medium in a main scanning direction with a group of light sources that are two-dimensionally disposed and exposing said recording medium as well as auxiliary-scanning said recording medium by moving said group of light sources in an auxiliary scanning direction substantially perpendicular to the main scanning direction, comprising the steps of:

moving said group of light sources in the auxiliary scanning direction at a second constant speed; and deflecting light from said group of light sources for exposing said recording medium in a direction inclined at a predetermined angle θ with respect to the main scanning direction in synchronism with movement of said recording medium in the main scanning direction and the auxiliary scanning direction with respect to said group of light sources, thereby said image to be recorded on said recording medium is caused to remain stationary in a relative relation to said recording medium in the main scanning direction and in the auxiliary scanning direction.

2. The image recording method according to claim 1, wherein after an image of one frame that is a range capable of being exposed by said group of light sources at a time has been exposed to said recording medium by said group of light sources, said image to be recorded on said recording medium is offset in the auxiliary scanning direction by an integral multiple of a first pixel pitch in the auxiliary scanning direction.

3. The image recording method according to claim 2, wherein when said integral multiple of the first pixel pitch in the auxiliary scanning direction is denoted by Ns, number of pixels of said one frame in the main scanning direction is denoted by Nimg m, a second pixel pitch in the main scanning direction is denoted by Pimg m, and said first pixel pitch in the auxiliary scanning direction is denoted by Pimg s, said predetermined angle θ is represented by the following formula, $$\tan \theta = (Ns \times Pimg\ s)/(Nimg\ m \times Pimg\ m).$$

4. The image recording method according to claim 1, wherein:

movement of an auxiliary scanning position and a deflecting position of an image of one frame that is a range capable of being exposed by said group of light sources at a time is synchronized with said relative movement of the recording medium with respect to said group of light sources that are two-dimensionally disposed during a non-exposure time zone from completion of exposure of the recording medium for one rotation of said drum to start of exposure of the recording medium for the next one rotation of said drum; and the image of said one frame exposed to the recording medium by said group of light sources in said next one rotation of the drum is exposed just adjacent to the image of said one frame exposed to the recording medium first by said group of light sources in said one rotation of said drum, and images of frames exposed by said group of light sources are arranged substantially at equal intervals.

5. An image recording apparatus, comprising:

a drum rotating at a first constant speed;

a recording medium attached around outside surface of said drum;

a group of light sources that are two-dimensionally disposed for exposing said recording medium in a main scanning direction;

an auxiliary scanning drive system for moving said group of light sources in an auxiliary scanning direction substantially perpendicular to the main scanning direction; and a light deflector for deflecting light from said group of light sources, wherein:

said auxiliary scanning drive system moves said group of light sources in the auxiliary scanning direction at a second constant speed; and said light deflector deflects the light from said group of light sources for exposing the recording medium in a direction inclined a predetermined angle θ with respect to the main scanning direction in synchronism with movement of said recording medium in the main scanning direction and the auxiliary scanning direction with respect to said group of light sources, thereby said image to be recorded on said recording medium is caused to remain stationary in a relative relation to said recording medium in the main scanning direction and in the auxiliary scanning direction.

6. The image recording apparatus according to claim 5, further comprising:

a device which offsets an image to be recorded on said recording medium in the auxiliary scanning direction by an integral multiple of a first pixel pitch in the auxiliary scanning direction after the image of one frame thereof that is a range capable of being exposed to said recording medium by said group of light sources at a time has been exposed to said recording medium by said group of light sources.

7. The image recording apparatus according to claim 6, wherein when said integral multiple of the first pixel pitch in the auxiliary scanning direction is denoted by Ns, number of pitches of said one frame in the main scanning direction is denoted by Nimg m, a second pixel pitch in the main scanning direction is denoted by Pimg m, and said first pixel pitch in the auxiliary scanning direction is denoted by Pimg s, said predetermined angle θ deflected by the deflector is represented by the following formula, $$\tan\theta = (Ns \times Pimg\ s)/(Nimg\ m \times Pimg\ m).$$

8. The image recording apparatus according to claim 5, further comprising:

a device which synchronizes movement of an auxiliary scanning position and a deflecting position of an image of one frame that is a range capable of being exposed by said group of light sources at a time with said relative movement of the recording medium with respect to said group of light sources that are two-dimensionally disposed during a non-exposure time zone from completion of exposure of the recording medium for one rotation of said drum to start of exposure of the recording medium for the next one rotation of said drum, wherein the image of said one frame exposed to the recording medium by said group of light sources in said next one rotation of the drum is exposed just adjacent to the image of said one frame exposed first by said group of light sources in said one rotation of said drum, and images of frames exposed by said group of light sources are arranged substantially at equal intervals.

* * * * *